(12) United States Patent
Abe

(10) Patent No.: US 8,400,520 B2
(45) Date of Patent: Mar. 19, 2013

(54) SUBJECT TRACKING PROGRAM AND CAMERA USING TEMPLATE MATCHING PROCESSING

(75) Inventor: Hiroyuki Abe, Yokohama (JP)

(73) Assignee: Nikon Corporation, Tokyo (JP)

(*) Notice: Subject to any disclaimer, the term of this patent is extended or adjusted under 35 U.S.C. 154(b) by 144 days.

(21) Appl. No.: 12/853,670

(22) Filed: Aug. 10, 2010

(65) Prior Publication Data

US 2011/0109759 A1 May 12, 2011

(30) Foreign Application Priority Data

Aug. 11, 2009 (JP) ................................. 2009-186530

(51) Int. Cl.
H04N 5/228 (2006.01)

(52) U.S. Cl. ....................... 348/222.1; 382/103; 375/240

(58) Field of Classification Search ............... 348/222.1, 348/208.14; 382/103
See application file for complete search history.

(56) References Cited

U.S. PATENT DOCUMENTS

| | | | | |
|---|---|---|---|---|
| 6,999,599 | B2* | 2/2006 | Rui et al. | 382/103 |
| 7,668,338 | B2* | 2/2010 | Yoon et al. | 382/103 |
| 7,835,542 | B2* | 11/2010 | Lin et al. | 382/103 |
| 8,131,014 | B2* | 3/2012 | Abe | 382/103 |
| 8,131,068 | B2* | 3/2012 | Abe et al. | 382/162 |
| 8,144,207 | B2* | 3/2012 | Abe | 348/222.1 |
| 8,233,661 | B2* | 7/2012 | Ikenoue | 382/103 |
| 8,311,276 | B2* | 11/2012 | Kizuki et al. | 382/103 |
| 2002/0080425 | A1* | 6/2002 | Itokawa | 358/496 |
| 2004/0189863 | A1* | 9/2004 | Gu et al. | 348/416.1 |
| 2006/0039587 | A1* | 2/2006 | Yoon et al. | 382/115 |
| 2006/0285723 | A1* | 12/2006 | Morellas et al. | 382/103 |
| 2007/0147661 | A1 | 6/2007 | Fukaya et al. | |
| 2009/0052741 | A1 | 2/2009 | Abe | |
| 2009/0097704 | A1* | 4/2009 | Savidge et al. | 382/103 |
| 2010/0296697 | A1 | 11/2010 | Ikenoue | |

FOREIGN PATENT DOCUMENTS

| | | |
|---|---|---|
| JP | A-2003-111063 | 4/2003 |
| JP | A-2005-44352 | 2/2005 |
| JP | A-2005-165688 | 6/2005 |
| JP | A-2007-011490 | 1/2007 |
| JP | A-2007-172237 | 7/2007 |
| JP | A-2008-26974 | 2/2008 |
| JP | A-2009-053815 | 3/2009 |
| JP | A-2009-087090 | 4/2009 |

OTHER PUBLICATIONS

Dec. 20, 2011 Office Action issued in Japanese Patent Application No. 2009-186530 (with translation).
May 22, 2012 Office Action issued in Japanese Patent Application No. 2009-186530 (with translation).

* cited by examiner

Primary Examiner — Kelly L Jerabek
Assistant Examiner — Cynthia Segura
(74) Attorney, Agent, or Firm — Oliff & Berridge, PLC

(57) ABSTRACT

A computer-readable computer program product contains a computer-executable subject tracking program in order to execute frame-to-frame subject tracking for a plurality of frames input in time series. The subject tracking program includes: an estimation procedure estimating a subject position within each frame by executing template matching processing for each of a plurality of partial areas assuming random positions within the frame; an identification procedure identifying a subject position within the frame by executing template matching processing for an estimated subject area containing the subject position having been estimated through the estimation procedure; a subject framing border display procedure displaying a subject framing border at the subject position having been identified through the identification procedure; and a tracking procedure tracking the subject position having been identified through the identification procedure from one frame to another through the plurality of frames.

6 Claims, 4 Drawing Sheets

SUBJECT TRACKING PROGRAM AND CAMERA USING TEMPLATE MATCHING PROCESSING

INCORPORATION BY REFERENCE

The disclosure of the following priority application is herein incorporated by reference:
Japanese Patent Application No. 2009-186530 filed Aug. 11, 2009

BACKGROUND OF THE INVENTION

1. Field of the Invention

The present invention relates to a subject tracking program and a camera.

2. Description of Related Art

Japanese Laid Open Patent Publication No. 2003-111063 discloses the following entering object tracking method. Namely, an object entering in the image-capturing field is detected through template matching executed by using a template image and the detection results are displayed through this method.

SUMMARY OF THE INVENTION

However, there is an issue yet to be effectively addressed with respect to an entering object tracking method in the related art in that sense the detection result cannot be displayed until a template matching operation executed for the entire image-capturing field set as the template matching target is completed, there will be a delay before the detection results can be brought up on display.

According to the 1st aspect of the present invention, a computer-readable computer program product contains a computer-executable subject tracking program in order to execute frame-to-frame subject tracking for a plurality of frames input in time series. The subject tracking program comprises: an estimation procedure estimating a subject position within each frame by executing template matching processing for each of a plurality of partial areas assuming random positions within the frame; an identification procedure identifying a subject position within the frame by executing template matching processing for an estimated subject area containing the subject position having been estimated through the estimation procedure; a subject framing border display procedure displaying a subject framing border at the subject position having been identified through the identification procedure; and a tracking procedure tracking the subject position having been identified through the identification procedure from one frame to another through the plurality of frames.

According to the 2nd aspect of the present invention, a computer-readable computer program product containing a computer-executable subject tracking program according to theist aspect may further comprise: a temporary subject framing border display procedure displaying a temporary subject framing border at the subject position having been estimated through the estimation procedure.

According to the 3rd aspect of the present invention, in a computer-readable computer program product containing a computer-executable subject tracking program according to the 1st aspect, the estimation procedure may determine positions to be assumed by the plurality of areas within the frame based upon the subject position having been estimated through the estimation procedure for a preceding frame.

According to the 4th aspect of the present invention, it is preferred that in a computer-readable computer program product containing a computer-executable subject tracking program according to the 1st aspect, the estimation procedure sets the plurality of partial areas within the frame by using a particle filter.

According to the 5th aspect of the present invention, a camera comprises: a generation unit that generates a plurality of frames in time series by executing image-capturing operation; and an execution unit that executes a subject tracking program according to the 1st aspect.

According to the 6th aspect of the present invention, a camera comprises: a generation unit that generates a plurality of frames in time series by executing image-capturing operation; an estimation unit that estimates a subject position within each frame by executing template matching processing for each of a plurality of partial areas assuming random positions within the frame; an identification unit that identifies a subject position within the frame by executing template matching processing for an estimated subject area containing the subject position having been estimated by the estimation unit; a subject framing border display unit that displays a subject framing border at the subject position having been identified by the identification unit; and a tracking unit that tracks the subject position having been identified by the identification unit from one frame to another through the plurality of frames.

According to the present invention, a temporary subject framing border can be displayed quickly.

DESCRIPTION OF PREFERRED EMBODIMENT

Figure 1:
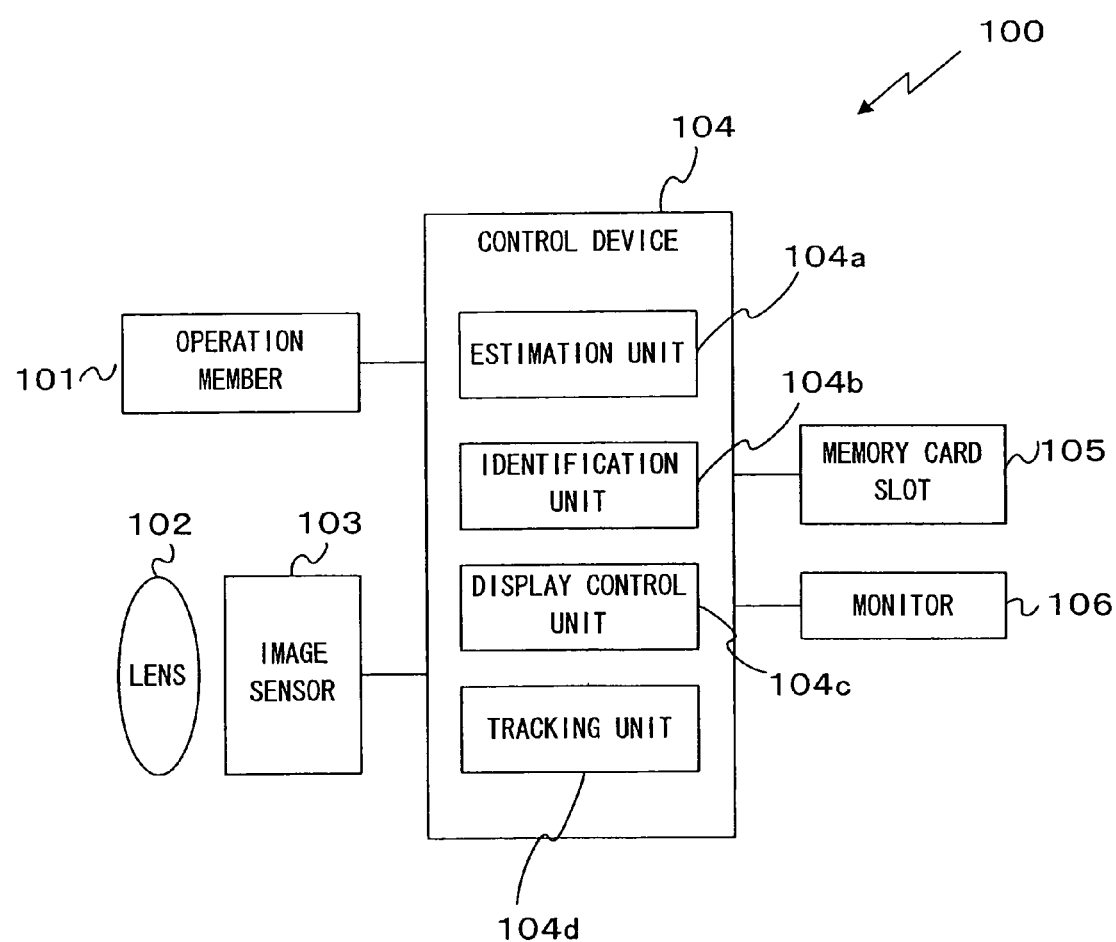
FIG. 1 is a block diagram showing the structure of the camera achieved in an embodiment.

FIG. 1 is a block diagram showing the structure of the camera achieved in an embodiment of the present invention. A camera 100 comprises an operation member 101, a lens 102, an image sensor 103, a control device 104, a memory card slot 105 and a monitor 106. The operation member 101 includes various input members operated by the user, such as a power button, a shutter release button, a zoom button, a cross key, a confirm button, a review button and a delete button.

While the lens 102 is constituted with a plurality of optical lenses, FIG. 1 simply shows a single representative lens. The image sensor 103, which may be a CCD image sensor or a CMOS image sensor, captures a subject image formed through the lens 102. The image sensor 103 outputs image signals obtained by capturing the image to the control device 104.

The control device 104 generates image data in a predetermined image format such as the JPEG format (hereafter referred to as "main image data") based upon the image signals input thereto from the image sensor 103. In addition, the control device 104 generates display image data, e.g., thumbnail image data, based upon the image data having been generated. The control device 104 creates an image file that contains the main image data and the thumbnail image data having been generated and is appended with header information. The image file thus created is output to the memory card slot 105. The embodiment is described by assuming that the main image data and the thumbnail image data are both image data expressed in the RGB colorimetric system.

At the memory card slot 105, in which a memory card, used as a storage medium, is inserted, an image file output from the control device 104 is recorded as the image file is written into the memory card. In addition, in response to an instruction issue from the control device 104, an image file stored in the memory card is read at the memory card slot 105.

At the monitor 106, which is a liquid crystal monitor (back side monitor) installed at the rear surface of the camera 100, an image stored in the memory card, a setting menu enabling selection of settings for the camera 100 and the like are displayed. In addition, as the user sets the camera 100 in a photographing mode, the control device 104 outputs to the monitor 106 display image data corresponding to image data generated based upon image signals obtained from the image sensor 103 in time series. A live-view image corresponding to the display image data is the displayed at the monitor 106.

The control device 104, constituted with a CPU, a memory and other peripheral circuits, controls the camera 100. It is to be noted that the memory constituting part of the control device 104 includes an SDRAM and a flash memory. The SDRAM, which is a volatile memory, is used as a work memory where a program executed by the CPU is opened and as a buffer memory where data are temporarily recorded. In the flash memory, which is a non-volatile memory, program data related to the program executed by the control device 104, various parameters that are read for program execution and the like are recorded. The control device 104 includes the functional units; an estimation unit 104a, an identification unit 104b, a display control unit 104c and a tracking unit 104d. The estimation unit 104a, the identification unit 104b, the display control unit 104c and the tracking unit 104d are to be described in detail later.

In the embodiment, the identification unit 104b of the control device 104 executes template matching processing for each of the frames constituting the live-view image input from the image sensor 104 by using a template image prepared in advance. By executing this template matching processing, the identification unit 104b is able to identify an image area within the frame, which is similar to the template image, as a subject position. Then, the display control unit 104c marks the subject position identified by the identification unit 104b by enclosing the subject position with a framing border in the live-view image on display at the monitor 106 so as, to clearly indicate the subject position to the user. In addition, the tracking unit 104d executes subject tracking processing by tracking the subject position identified by the identification unit 104b from one frame to the next.

It is to be noted that the template image used in this processing is obtained in advance based upon an instruction issued by the user. The user may, for instance, specify a range containing a frame-to-frame tracking target subject inside the first frame of the live-view image brought up on display at the monitor 106 by operating the operation member 101. The control device 104 in response may extract the image within the range specified by the user as a template image and store it into the SDRAM. By executing template matching processing with a template image containing the subject that the user wishes to track and tracking the identified subject position from one frame to the next, as described above, the tracking target specified by the user can be tracked.

The following issue is bound to arise when a framing border (subject frame) indicating the subject position is displayed in the live-view image after identifying an accurate subject position through the template matching processing executed in the camera for the entire image frame, as described above. Namely, since the subject framing border cannot be displayed until the template matching processing executed in the camera for the entire image frame is completed, a subject framing border cannot be displayed promptly. This issue is addressed in the camera 100 achieved in the embodiment by estimating a subject position through template matching processing executed for part of the frame and displaying a temporary subject framing border at the estimated position.

Figure 2:
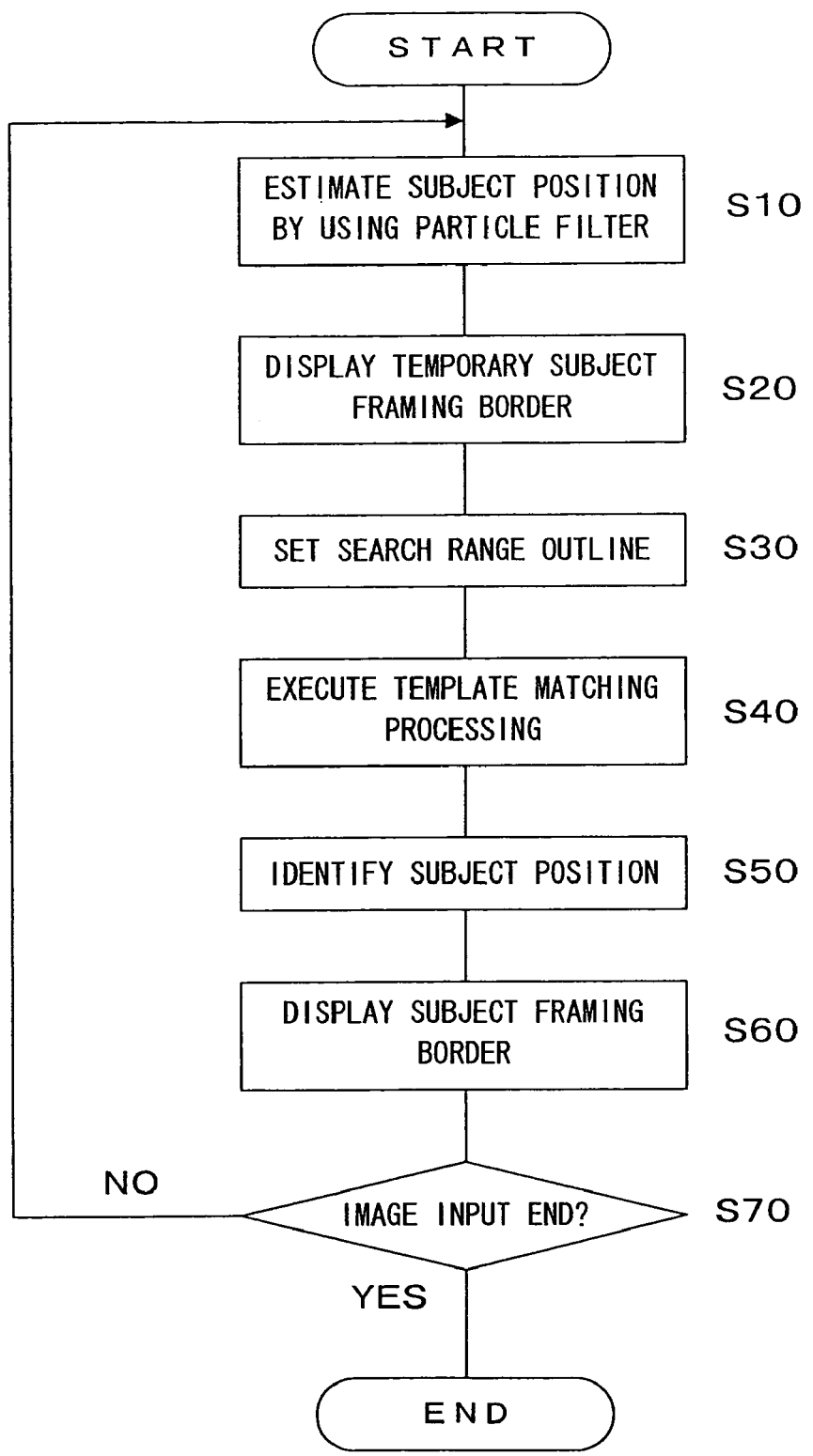
FIG. 2 presents a flowchart of the subject tracking processing.

In more specific terms, the control device 104 executes the processing described below. FIG. 2 presents a flowchart of the subject tracking processing executed in the embodiment. It is to be noted that the processing in FIG. 2 is executed by the control device 104 with a program started up as live-view image input from the image sensor 103 begins.

In step S10, the estimation unit 104a of the control device 104 estimates the subject position by using a particle filter. A particle filter is a type of time-sequence filter utilized to estimate the current state based upon a previous state and current observation information by using numerous particles. In reference to FIG. 3, a method that may be adopted when estimating the subject position by using such a particle filter is described. It is to be noted that the method for estimating the subject position by using a particle filter is shown in FIG. 3 in a schematic, one dimensional illustration for simplification.

Figure 3:
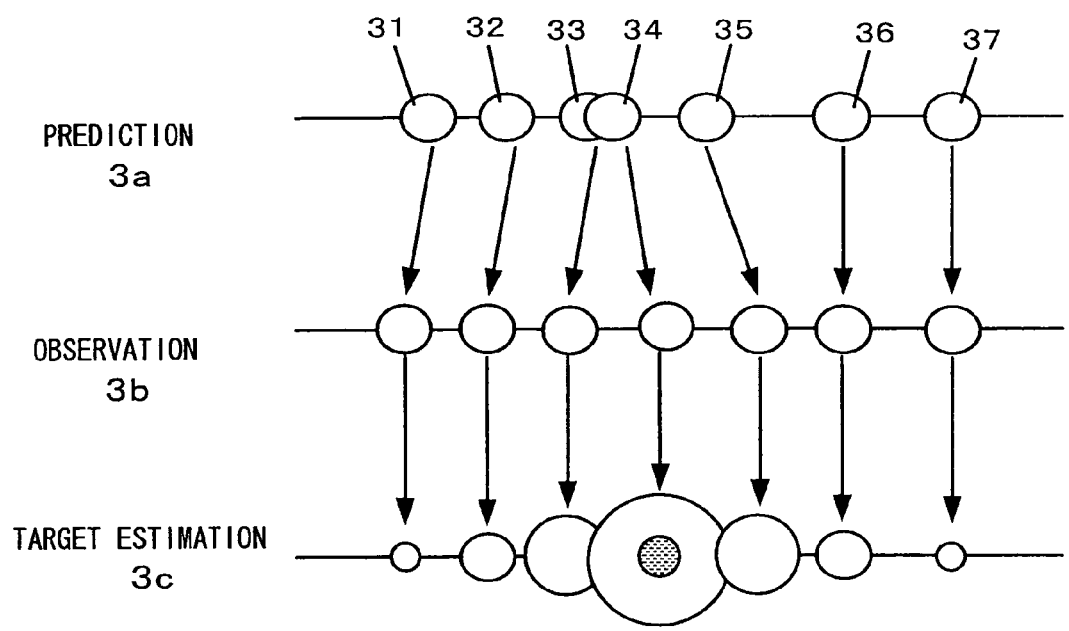
FIG. 3 schematically illustrates a method through which the subject position is estimated by using a particle filter.

As shown in FIG. 3, the estimation unit 104a of the control device 104, estimating the subject position by using a particle filter, executes four operations for each frame, i.e., prediction 3a, observation 3b, target estimation 3c and selection 3d. In more specific terms, the estimation unit 104a executes processing as described below. The prediction operation 3a, the observation operation 3b and the target estimation operation 3c, among the four operations, are executed in order to estimate the subject position within the frame. The prediction operation 3a, the observation operation 3b and the target estimation operation 3c are first described.

In the prediction operation 3a, the estimation unit 104a designates a specific point within the frame, such as a point in the frame specified by the user or the central point within the frame, as a reference point and randomly scatters particles, the quantity of which is set in advance, through the frame from the reference point by using a random number G. In the example presented in FIG. 3, the quantity of particles scattered in this manner is seven. In other words, the estimation unit 104a scatters particles 31 to 37 inside the frame. It is to be noted that while FIG. 3 presents a one dimensional illustration, as explained earlier, the actual subject position estimation target image is a two-dimensional image and thus, the particles are, in fact, scattered over a two-dimensional space. In addition, while the quantity of particles being scattered in the example presented in FIG. 3 is limited to seven in order to simplify the explanation, the quantity of particles is not limited to seven. The estimation unit 104a designates the positions to which these particles are scattered within the frame as predicted subject positions and executes the observation operation 3b for these scattered positions, as described below.

In the observation operation 3b, the estimation unit 104a first sets search range outlines enclosing a partial area centered on one of the plurality of points within the frame extracted by scattering the plurality of particles, i.e., centered on a point at which a scattered particle is present. The estimation unit 104a then executes matching processing (template matching processing) for the image within each search range outline by shifting the template image mentioned earlier within the search range outline, so as to calculate a similarity factor indicating the degree of similarity at the particular scattered particle position to the template image. It is to be noted that while a detailed explanation of a similarity factor calculation method that may be adopted in this processing, which is of the known art, is not provided, the similarity factor may be calculated based upon, for instance, the differential value representing the difference between the image inside the search range outline and the template image or a correlation value indicating a correlation between the image inside the search range outline and the template image.

The estimation unit 104a calculates a likelihood factor as expressed in (1) below based upon the similarity factor having been calculated. Then, the estimation unit 104a calculates a weighting value to be used when estimating the subject position, based upon the likelihood factor having been calculated as described above. This weighting value is equivalent to a normalized likelihood factor, which is calculated by dividing the initial likelihood factor by a total sum of all the likelihood factors, as expressed in (2) below.

$$1 / \text{similarity factor} \rightarrow \text{likelihood factor } \pi_t^{(i)} \quad (1)$$

$$w_t^{(i)} = \pi_t^{(i)} \bigg/ \sum_{i=1}^{N} \pi_t^{(i)} \quad (2)$$

It is to be noted that $\pi$, w, t and i in expressions (1) and (2) above respectively represent the likelihood factor, the weighting value, the time point and the number assigned to the corresponding particle. Namely, through the arithmetic operation executed as expressed in (1), the likelihood factor $\pi_t^{(i)}$ at the time point t is calculated for the particle assigned with number i (e.g., 1 to 7). Then, through the arithmetic operation executed as expressed in (2), the weighting value $w_t^{(i)}$ at the time point t is calculated for the particle assigned with number i (e.g., 1 to 7). A greater weighting value $w_t^{(i)}$ is calculated for a particle position at which a greater degree of similarity to the template image manifests.

Subsequently, in the target estimation operation 3c, the estimation unit 104a calculates a central position $P_t$ of the subject within the frame at the time point t, as expressed in (3) below, by using the weighting values $w_t^{(i)}$ calculated through the observation operation 3b and the positions $X_t^{(i)}$ assumed by the individual scattered particles within the frame at the time point (t). The central position $P_t$ of the subject calculated as expressed in (3) is designated as an estimated subject position within the frame.

$$P_t = \sum_{i=1}^{N} w_t^{(i)} x_t^{(i)} \quad (3)$$

By executing the prediction operation 3a, the observation operation 3b, and the target estimation operation 3c as described above, the subject position within the frame can be estimated.

In the schematic illustration provided in FIG. 3, the results obtained by multiplying the particle position $X_t^{(i)}$ by the corresponding weighting value $w_t^{(i)}$ as indicated in (3), which vary from one particle position to another, are shown by assuming different sizes for the individual particles. Namely, in the example presented in FIG. 3, the multiplication results corresponding to the particle position $X_t^{(i)}$ at which the particle 34 is present indicate the largest value, the multiplication results for the particle positions $X_t^{(i)}$ at which the particles 33 and 35 are present indicate second-largest values, the multiplication results for the particle position $X_t^{(i)}$ at which the particles 32 and 36 are present indicate third-largest values and the multiplication results for the particle position $X_t^{(i)}$ at which the particles 31 and 37 are present indicate the smallest values Subsequently, the operation proceeds to step S20, in which the display control unit 104c brings up on display a temporary subject framing border so as to enclose a predetermined range centered on the subject position estimated by the estimation unit 104a through the processing executed in step S10, as described above, i.e., the central position $P_t$ of the subject having been calculated in the target estimation operation 3c. Thus, the control device 104 is able to display a temporary subject framing border promptly without having to complete template matching processing for the entire image frame.

The operation then proceeds to step S30. In step S30, the identification unit 104b sets a search range outline enclosing a partial area (estimated subject area) within the image frame, which includes the subject position having been estimated by the estimation unit 104a in step S10. Once step S30 has been executed, the operation proceeds to step S40. In step S40, the identification unit 104b executes the template matching processing mentioned earlier for the image area contained in the search range outline (estimated subject area) having been set in step S30. Subsequently, the operation proceeds to step S50 in which the identification unit 104b identifies the exact subject position within the frame based upon the results of the template matching processing executed in step S40, and then the operation proceeds to step S60.

In step S60, the display control unit 104c brings up on display a true subject framing border at the correct subject position within the frame having been identified by the identification unit 104b in step S50, before the operation proceeds to step S70. In step S70, the control device 104 makes a decision as to whether or not the live-view image input has ended. If a negative decision is made in step S70, the operation returns to step S10 to repeatedly execute the processing in step S10 through step S70, as described earlier, for the next frame. However, if an affirmative decision is made in step S70, the operation ends.

It is to be noted that when executing the processing in step S10 for the next frame, the estimation unit 104a scatters the predetermined quantity of particles in the prediction operation 3a, based upon the results of the target estimation operation 3c executed in step S10 for the preceding frame. In this step, the estimation unit 104a scatters seven particles based upon scattered particle positions $X_{t-1}^{(i)}$, a subject displacement velocity $v_{t-1}$ and the random number G, as expressed in (4) or (5) below, from the particle position assumed by the particle 34 in correspondence to which the multiplication results indicating the largest value were obtained through the previous target estimation operation 3c explained earlier.

$$X_t^{(i)} = X_{t-1}^{(i)} + v_{t-1} + G \quad (4)$$

$$X_t^{(i)} = X_{t-1}^{(i)} + v_{t-1} \times G \quad (5)$$

It is to be noted that the subject displacement velocity $v_{t-1}$ may be calculated as expressed in (6) below based upon the positional change per unit time t, which has been observed between the subject central position $P_{t-1}$ in the immediately preceding frame and the subject central position $P_{t-2}$ in the frame preceding the immediately preceding frame.

$$v_{t-1} = (P_{t-1} - P_{t-2})/t \quad (6)$$

The following advantages are achieved through the embodiment described above.

(1) The estimation unit 104*a* of the control device 104 estimates the subject position within the frame by executing template matching processing for areas contained in the search range outlines set based upon the individual positions assumed by particles scattered within the frame, i.e., for a plurality of areas assuming randomly set positions. The display control unit 104*c* brings up on display a temporary subject framing border at the subject position estimated by the estimation unit 104*a*. In addition, the identification unit 104*b* identifies the true subject position within the frame by executing template matching processing for the area contained in the search range outline (estimated subject area) set based upon the subject position having been estimated by the estimation unit 104*a*. The display control unit 104*c* then brings up on display a subject framing border at the identified subject position. Thus, a subject framing border can be brought up on display promptly in the form of a temporary subject framing border through simple template matching processing, without having to execute template matching processing for the entire image data contained in the frame.

(2) The estimation unit 104*a* designates a reference point at which particles are to be scattered for the next frame, based upon the subject position having been estimated in correspondence to the preceding frame. This means that the particles can be scattered from a reference point assuming a position at which the subject is likely to be present and, as a result, the accuracy with which the subject position is estimated for the next frame can be improved.

(3) The estimation unit 104*a* estimates the subject position by using a particle filter. In other words, the estimation unit 104*a* uses a particle filter to set a plurality of partial areas within the frame. When a very high level of accuracy is not required in subject position estimation, as in this case, a particle filter can be utilized in conjunction with a small quantity of particles instead of a larger number of particles in the order of, for instance, several hundreds, and thus, the subject position can be estimated through quick processing.

—Variations—

It is to be noted that the camera achieved in the embodiment described above allows for the following variations.

(1) The control device 104 in the embodiment described above executes subject tracking for a live-view image. However, the control device 104 in a camera 100 equipped with a movie shooting function may execute frame-to-frame subject tracking for a recorded movie image instead of the live-view image.

(2) In the embodiment described above, the present invention is adopted in the camera 100. However, the present invention is not limited to this example and may be adopted in other types of apparatuses having a photographing function, such as a portable telephone equipped with a camera, a video camera and the like.

(3) The subject tracking program according to the present invention, executed in the standalone-type camera 100 achieved in the embodiment is normally installed in a ROM or the like at the time of manufacture. As an alternative, the subject tracking program may be recorded in a rewritable ROM, and the camera 100 may assume a structure that allows it to connect with a computer. In this case, the camera will be able to take in a program upgrade provided in a recorded medium such as a CD-ROM via the computer. As a further alternative, the program upgrade may be downloaded via the Internet or the like.

Figure 4:
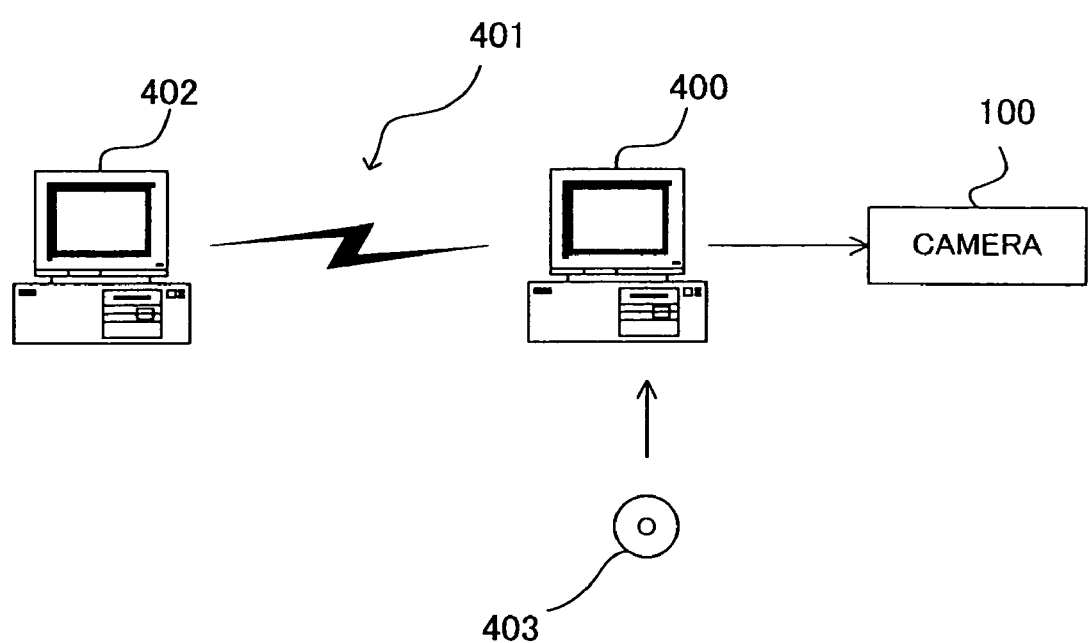
FIG. 4 shows the overall configuration of a program product providing system.

FIG. 4 illustrates how the program may be provided. A personal computer 400 receives the program via a recording medium such as a CD-ROM. The personal computer 400 is also capable of connecting with a communication line 401. A computer 402 is a server computer that provides the program stored in a recording medium such as a hard disk 403. The communication line 401 may be the Internet, a communication network for personal computers, or it may be a dedicated communication network. The computer 401 reads out the program from the hard disk 403 and transmits the program to the personal computer 400 via the communication line 401. Namely, the program embodied as data signals and carried on a carrier wave is transmitted via the communication line 401. In other words, the program can be provided as a computer-readable computer program product assuming any of various modes such as a recording medium and a carrier wave.

The above described embodiment is an example and various modifications can be made without departing from the scope of the invention.

What is claimed is:

1. A non-transitory computer-readable computer program product containing a computer-executable subject tracking program in order to execute frame-to-frame subject tracking for a plurality of frames input in time series, the subject tracking program comprising:
   an area determination procedure determining a plurality of partial areas assuming random positions within the frame;
   an estimation procedure estimating a subject position within each frame by executing template matching processing for each of the plurality of partial areas having been defined through the area determination procedure;
   a temporary subject framing border display procedure displaying a temporary subject framing border at the subject position having been estimated through the estimation procedure;
   an identification procedure identifying a subject position within the frame by executing template matching processing for an estimated subject area containing the subject position having been estimated through the estimation procedure;
   a subject framing border display procedure displaying a subject framing border at the subject position having been identified through the identification procedure; and
   a tracking procedure tracking the subject position having been identified through the identification procedure from one frame to another through the plurality of frames.

2. A non-transitory computer-readable computer program product containing a computer-executable subject tracking program according to claim 1, wherein:
   the temporary subject framing border display procedure displays the temporary subject framing border at the subject position having been estimated through the estimation procedure before the identification procedure identifies the subject position within the frame.

3. A non-transitory computer-readable computer program product containing a computer-executable subject tracking program according to claim 1, wherein:
   the area determination procedure determines positions to be assumed by the plurality of areas within the frame based upon the subject position having been estimated through the estimation procedure for a preceding frame.

4. A non-transitory computer-readable computer program product containing a computer-executable subject tracking program according to claim 1, wherein:
   the area determination procedure sets the plurality of partial areas within the frame by using a particle filter.

5. A camera, comprising:
a generation unit that generates a plurality of frames in time series by executing image-capturing operation; and
an execution unit that executes a subject tracking program according to claim 1.

6. A camera, comprising:
a generation unit that generates a plurality of frames in time series by executing image-capturing operation;
an area determination unit that determines a plurality of partial areas assuming random positions within the frame;
an estimation unit that estimates a subject position within each frame by executing template matching processing for each of a plurality of partial areas determined by the area determination unit;
a temporary subject framing border display unit that displays a temporary subject framing border at the subject position estimated by the estimation unit;
an identification unit that identifies a subject position within the frame by executing template matching processing for an estimated subject area containing the subject position having been estimated by the estimation unit;
a subject framing border display unit that displays a subject framing border at the subject position having been identified by the identification unit; and
a tracking unit that tracks the subject position having been identified by the identification unit from one frame to another through the plurality of frames.

* * * * *